March 24, 1959 N. D. LARKY 2,879,329

COLOR TELEVISION

Filed June 29, 1954 2 Sheets-Sheet 1

INVENTOR.
NORBERT D. LARKY
BY
Olin J. Mitchell
ATTORNEY

March 24, 1959 N. D. LARKY 2,879,329

COLOR TELEVISION

Filed June 29, 1954 2 Sheets-Sheet 2

INVENTOR.
NORBERT D. LARKY
BY
[signature]
ATTORNEY

United States Patent Office 2,879,329
Patented Mar. 24, 1959

2,879,329

COLOR TELEVISION

Norbert D. Larky, Somerville, N.J., assignor to Radio Corporation of America, a corporation of Delaware Application June 29, 1954, Serial No. 440,118
21 Claims. (Cl. 178—5.4)

The present invention relates to synchronizing and time multiplexing circuits, and more particularly to synchronizing and time multiplexing circuits of the type employed in color television receivers.

Color television provides the reproduction on the viewing screen of the receiver of not only the relative luminescence and brightness but also the color hue and saturation of the color details in the original scene. The electrical transfer of the color images is accomplished by additive methods. Additive methods produce natural color images by breaking down the light from an object into a predetermined number of selected primary or component colors. Component colors may then be transferred electrically by analyzing the light from an object into not only its image elements as is accomplished by normal scanning procedure, but also by analyzing the light from elemental areas of the image into selected primary or component colors and deriving therefrom a signal representative of each of the selected color components. The color image may then be reproduced at a remote point by appropriate reconstruction from a color signal.

In order that the reproduction of a color image may be achieved with suitable fidelity in a receiver which is adapted to receive color television signals and perform the functions of the reconstruction of the color image on an appropriate color image reproducer, it is important that complete cooperation between the transmitter and the receiver be accomplished. As a result much emphasis is placed on the development and utilization of synchronizing methods in color television wherein it is necessary to not only maintain accurate deflection scanning, but also it is necessary to provide accurate synchronism in the timing of the color signal selection.

In order that the need for color sync signal synchronization of extreme accuracy might be appreciated, consider first the nature of the color television signal which conveys both the monochrome and color image to the receiving apparatus. It is to be understood that the color image information is accompanied by a sound modulated subcarrier which conveys the sound information; this sound subcarrier is located in the transmitted signal spectrum at a position 4½ mc. from the carrier signal of the transmitted video information.

The color television picture is resolved into a set of four different types of signals. One of these component signals is the synchronizing signal which synchronizes the deflection circuits of the receiver with the information which is being transmitted.

The second component color signal is termed the luminance or monochrome information. This information corresponds to the information which is normally transmitted for a monochrome image in black-and-white television signal transmission. When considered in terms of its use in the transmission of color television information, it is important to realize that the luminance or monochrome signal is actually formed by the combination of three primary color signals. It has been found that the component color signals, namely red, green, and blue, which are used in color television, do not appear equally bright because they are located in different parts of the spectrum and hence stimulate the brightness sensation by different amounts. However, if the three primaries are mixed in right proportions, it has been found that the green primary, which is located at the center of the visible spectrum, accounts for 59% of the brightness sensation, while the blue primary accounts for 11% of the brightness sensation, and the red primary accounts for 30% of the brightness sensation. It then follows that it is possible to achieve a monochrome component color television signal by cross-mixing red, green, and blue primary signals according to the proportions whereby 59% green signal, 30% red signal, and 11% blue signal, are combined to form a unit white signal. This resultant signal is termed the monochrome or luminance signal, or when referred to in terms of the circuit components which are used in color television receivers, the Y signal. This Y signal is generated in accordance with existing scanning standards; i.e. 525 lines, 60 fields per second, and 30 frames per second, and should be treated exactly like a standard monochrome signal with respect to bandwidth and the addition of synchronizing and blanking pulses.

The additional signals required to produce a color picture are the chrominance signals and the color synchronizing signals. Consider first the nature of the chrominance signal. It has been shown that the monochrome or luminance signal already contains predetermined amounts of component color signals, namely the Y signal which is made up of, as has been stated, 59% green, 30% red and 11% blue; it then follows that if it is desired that red, green, and blue signals be required, signals of the type $R-Y$, $G-Y$, and $B-Y$ will indicate how each color in the televised scene differs from a monochrome version of the color of the same luminance.

It would appear from the preceeding paragraph that to keep the monochrome and the color information representative of a color television picture means must be provided for transmitting a trio of color-difference signals. Actually, since color-difference information signals are interrelated, it would only be necessary to transmit two of the three color-difference signals with the third color-difference signal being formed at the receiver by suitable recombination of the two transmitted color-difference signals. In the choice of a pair of color-difference signals which are to be formed for inclusion with the color television signals it has been found convenient to adopt a pair of signals known as I and Q signals rather than the color-difference signals of the $R-Y$, $G-Y$, and $B-Y$ type. The I signal is a wide band color-difference signal describing information along what is principally an orange-cyan axis. The Q signal is a narrow band signal which describes information along what is principally a green-purple axis. The choice of the I and Q system rather than, for example, and $R-Y$ and $B-Y$ system is made due to the fact that the eye has increased acuity for information along the orange-cyan axis. This is tantamount to prescribing that for fine detail monochrome information is utilized: for large patches of color detail three-color information is utilized: and for intermediate size patches of color detail two-color information is utilized.

The manner of transmitting the chrominance information is one involving the use of a unique type of color subcarrier. This color subcarrier has a frequency of approximately 3.58 mc. which is approximately 0.6 mc. removed from the upper edge of the practical video signal transmission band which is located at approximately 4.2 mc. The manner of modulating the color subcarrier is to use what is termed the two phase modulation technique. In this modulation technique one color subcarrier having a frequency of approximately 3.58 mc. at one phase is amplitude modulated by the I signal; the Q signal is used to amplitude modulate a second subcarrier having the same frequency as the first subcarrier but being 90° apart in phase. The I and Q modulated subcarriers are then combined in a common transmission channel to form a unique type of modulated color subcarrier in which not only are the I and Q information present, but also, as will be described later in the specifications, color information through the entire gamut of the useable color range including the previously mentioned $R-Y$, $G-Y$, and $B-Y$ color-difference information. All of the component hue signals which are included in the modulated color subcarrier will be identified by component signals of a particular phase. The saturation associated with a particular hue will be associated with the amplitude of the component signal having the phase prescribed by the hue. At the receiver the signal information relating to any desired hue may be recovered by employing the processes of synchronous detection; that is to heterodyne the modulated color subcarrier by a locally generated heterodyning signal having the frequency of the color subcarrier but having the phase associated with the particular hue being demodulated. If a multiplicity of hues are required for demodulation at the receiver it follows then that a corresponding set of heterodyning signals must be provided each having the frequency of the modulated color subcarrier and a phase related to the phase of the corresponding hue.

The color television signal, which represents both signals relating to the monochrome information and the color television signal which includes both hue and saturation information is then transmitted to the color television receiver. It follows from the preceding paragraph that if the processes of synchronous detection are to be employed, then means must be provided for accurately synchronizing the phases of locally generated heterodyning or synchronous detection signals with the color information which is being sent at the transmitter. This is uniquely accomplished by including a color synchronizing burst of approximately 8 cycles of the color subcarrier frequency on the back porch of the horizontal synchronizing pulse. The phase of the color synchronizing burst is such that it leads the I signal by 57°, the I signal in turn leading the Q signal by 90°. The phase of the burst will also bear a predetermined phase relationship with each of the many other hues which are included in the modulated color subcarrier.

In order for the color synchronizing burst to be used to provide synchronous detection signals having accurately controlled phases in the color television receiver, it is evident that frequency and phase synchronizing circuits having unusual characteristics both from the standpoint of accuracy and also the ability to achieve synchronism with a color synchronizing burst of very short duration must be employed in the color television receiver. It is to provide new and improved methods of achieving color synchronizing burst responsive local oscillator synchronization in a receiver that the present invention is dedicated.

There are several methods of automatic frequency control which are used in color television receivers. One method, for example, involves the use of a reactance tube type of automatic frequency control circuit. In this circuit the color television signal is passed through a gate circuit which separates the color synchronizing burst from the remainder of the color television signal. This separated synchronizing burst is then compared with the output of the local oscillator in an appropriate reactance tube or frequency comparator circuit to develop a reference signal whose magnitude is indicative of the phase and frequency difference between the color synchronizing burst and the local oscillator signal. This reference signal is then integrated and applied to a reactance tube which maintains frequency and phase control of the local oscillator subject to the phase and frequency characteristics of the color synchronizing burst.

The present invention does not teach a new approach to burst synchronized color oscillator theory; rather, it teaches simplified circuits which accomplish the many functions required of the automatic frequency control and phase control circuit within a single circuit or within a circuit which is designed for maximum simplicity.

It is therefore an object of this invention to provide a simplified circuit for producing a burst synchronized local oscillator signal.

It is yet another object of this invention to provide a simplified discriminator type of circuit.

It is yet another object of this invention to provide a simplified combined oscillator-reactance tube and phase discriminator circuit for use in a color television receiver.

It is yet another object of this invention to provide an improved and simplified frequency and phase controlled oscillator for use in a color television receiver.

It is yet a further object of this invention to provide a simplified combined burst responsive automatic frequency controlled oscillator for providing a color subcarrier in a color television receiver.

According to one form of this invention combined phase discriminator action and local oscillator action incorporating automatic frequency control may be included in a single multigrid tube in which at least one of the grids is used for oscillator action in conjunction with an oscillator tank circuit, with the gated burst applied to the anode to develop a frequency control voltage there which can be integrated and applied to an external reactance tube which is associated with the oscillator tank circuit or applied to the one of the control grids associated with the oscillator in such a manner that frequency control and phase control of the oscillator output is provided.

The action of applying the gate pulse to one of the grids can also be utilized for providing start-stop action of the oscillator so that in application of the oscillator for example to color television the oscillator may be turned off or caused to reduce oscillation level at the end of the scanning line and to resume oscillation under the influence of the color synchronizing burst.

Other and incidental objects of this invention will become apparent upon a reading of the following specification and a study of the drawings in which.

Figures 1, 2, 3, 4, 5, 6:
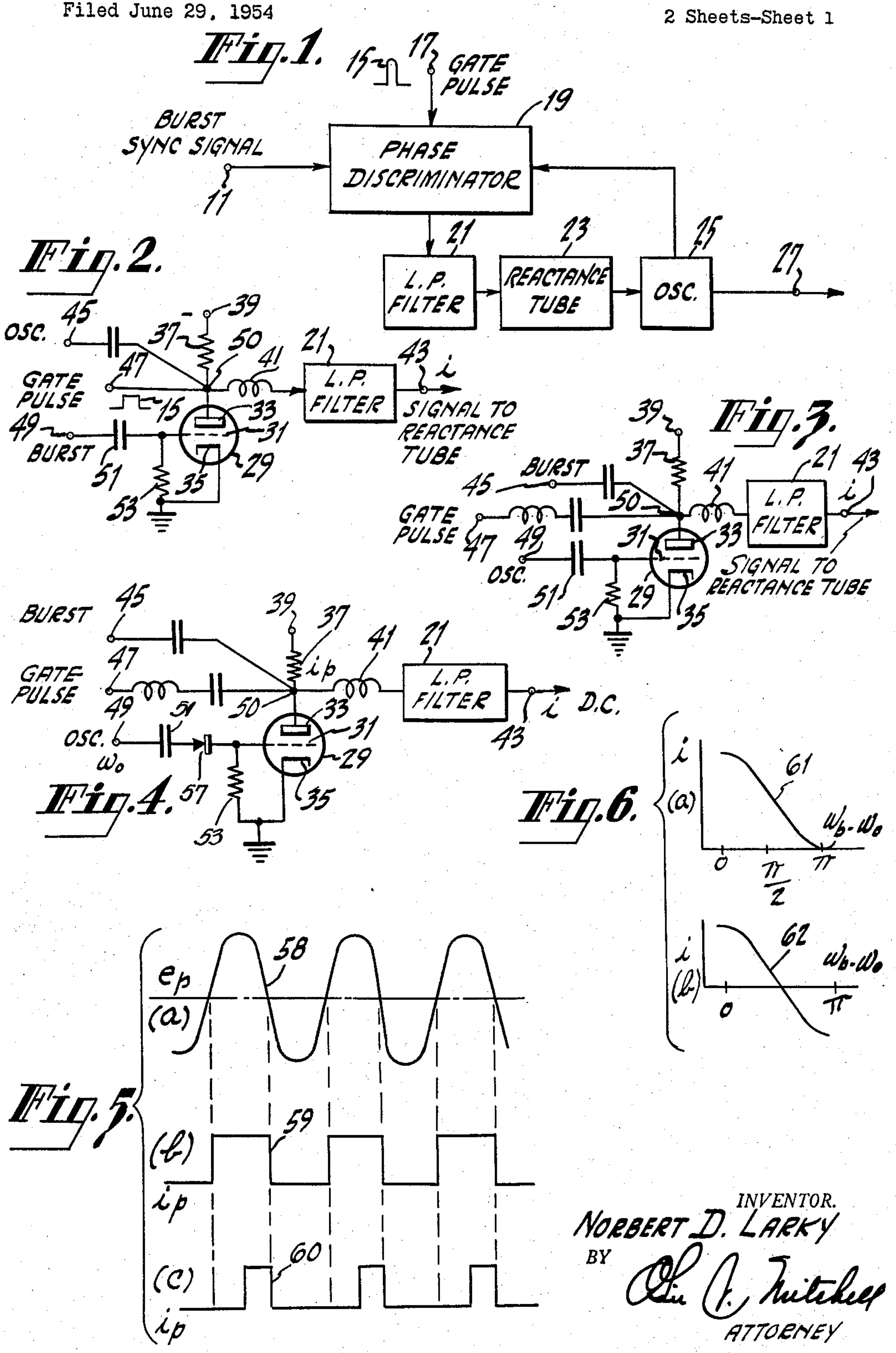
Figure 1 shows a basic phase discriminator-reactance tube frequency control circuit.
Figure 2 shows one type of triode discriminator system which furnishes concepts relevant to the present invention.
Figure 3 shows another type of discriminator which follows the teachings of the present invention.
Figure 4 shows still another type of discriminator circuit whose operation follows from the teachings of the present invention.
Figure 5 shows plate and current waveforms associated with the operation of the circuits shown in Figures 2, 3, and 4.
Figure 6 shows the discriminator characteristic curve as a function of phase which is associated with the circuits shown in Figures 2, 3 and 4.

Figure 1 shows the block diagram of an automatic phase and frequency control circuit. In this circuit a burst sync signal which is a synchronizing signal having a relatively short duration period is applied to the input terminal 11 at the same time the oscillator 25 is delivering an output signal to the output terminal 27; this output signal has a frequency and phase substantially that of the burst sync signal. The output of the oscillator 25 and the burst sync signal are both applied to the phase discriminator 19. In one version of the type of invention a gate pulse 15 is also applied to the gate pulse terminal 17 of the phase discriminator 19 so that the phase discriminator will be caused to operate during the interval of the burst sync signal. The phase discriminator 19 yields an output signal to the low pass filter 21. This output signal, since the burst sync signal is of relatively short duration, will be a signal which will give an indication of the phase difference between the burst sync signal and the oscillator signal for the duration of the burst sync signal. The action of the low pass filter 21 is to convert this phase indication signal into a substantially constant D.-C. voltage whose level is an indication of any phase and frequency difference between the burst sync signal and the oscillator signal. The output of the low pass filter 21 is then used to activate the reactance tube 23 which is coupled to the oscillator 25. The action of the reactance tube 23 is such whereby the phase and frequency of the oscillator are adjusted to a prescribed phase and frequency relative to the phase and frequency of the burst signal. It will be the purpose of the system taught by the present invention to simplify the multiparameter system described in connection with Figure 1. The succeeding Figures 2, 3 and 4 will describe simplified and improved types of phase discriminators; the specifications will teach at least one combination wherein phase discriminator action, oscillator action, and reactance tube action can all be accomplished utilizing a single multigrid electron tube.

Consider the elementary discriminator circuit shown in Figure 2. The term elementary arises from consideration of the simplicity of the circuit, not from the fact that it also operates utilizing a relatively simple principle of operation. As is seen in Figure 2 the burst is applied to the grid terminal 49 which utilizes the capacitance 51 and the resistance 53 to impress the signal on the grid 31 of the triode 29. Note that this cathode 35 is grounded. By proper design of the condenser 51 and the resistance 53 the triode 29 will act as a limiter so that any periodic signals applied to the input terminal 49 are transformed into a series of corresponding pulses of current which reach the anode 33 of the triode 29.

The anode 33 is coupled through the anode resistor 37 to the negative bias source 39; the reason for utilizing the negative bias source to impress the negative potential on the terminal 39 will be described in connection with the diagram shown in Figure 6. Returning however to the nature of the circuitry involved with respect to the phase discriminator circuit shown in Figure 2, it is seen that coincidentally applied to the anode 33 are the oscillator signal as applied to the terminal 45 and the gate pulse 15 as applied to the terminal 47. The action of the gate pulse 15 is to raise the potential of the anode 33 to a sufficiently high positive potential during the duration of the burst so that a signal will appear at the anode terminal 50 which is indicative of any phase and frequency difference between the oscillator output and the burst as measured during the duration interval of the gate pulse 15. The frequency and phase difference indicative potential produced at the anode terminal 50 is then passed through the low pass filter 21 so that the signal developed at the output terminal 43 consists of a D.-C. current or a D.-C. voltage which may be applied to a suitable frequency controlling element such as a reactance tube for oscillator frequency control. The purpose of the choke 41 is to prevent the oscillator signal 45 from being shunted to ground by the capacitors of the LP filter.

Figure 3 shows a circuit identical to that shown in Figure 2 with the exception of the fact that the burst is applied to the terminal 45 with the oscillator signal applied to the grid terminal 49. Since the triode discriminator always functions during the duration of the gate pulse 15, it follows then that no substantial change in operating conditions are affected by this change of excitation signals. Should the entire color television signal be applied to the terminal 45, it follows that gating of the burst will be achieved since the triode 29 is turned on only during the duration period of the gate pulse.

Figure 4 shows a slight extension of the circuit shown in Figure 3 in that the grid circuit consisting of the grid terminal 49 in conjunction with the condenser 51 and the resistor 53 which are coupled to the control grid 31 now includes the rectifier 57. This improves the previously mentioned limiting action which provides additional squaring action on the current pulses reaching the anode 33 as a result of periodic signals applied to the grid terminal 49.

The operation of any of the three versions of the triode discriminator circuit shown in Figures 2, 3 and 4 is shown in Figure 5 where the curve 58 describes the anode potential produced by either the burst or the oscillator action on the anode during the duration of the gate pulse 15. This signal as represented by the sine wave 58 is a signal provided during the duration of the gate pulse and represents the A.-C. excursion of the anode 33 for the duration of the gate pulse. The plate current curve 59 shows the type of square pulse curve which is produced when an A.-C. signal is applied to a terminal 49; this A.-C. signal being in phase with the A.-C. potential applied to the anode terminal 50. This represents the condition where the maximum average value of pulse current appears at the terminal 50. The squared pulse current 60 represents the condition where the signal applied to the grid terminal 49 is approximately 90° out of phase with respect to the A.-C. signal being applied to the anode terminal 50, assuming that no additional phase shifts are produced by the resistors and condensers utilized in either of the grid or the anode circuits of the triode discriminators. It is seen that this squared pulse current 60 has shorter duration than the duration of the squared pulse current 59; this will lead to the appearance of an average current of smaller magnitude at the anode terminal 50. For the case where the signal applied to the grid terminal 49 is 180° out of phase with respect to the signal applied to the anode terminal 45, then the pulse current reaching the anode will actually fall to substantially zero.

Figure 6 shows the discriminator characteristic curve which follows from the discussion in connection with Figure 5. If $\omega_b$ is used to represent the angular frequency of the burst and $\omega_o$ is used to represent the angular frequency of the oscillator, then plotting $I_{dc}$ as a function of $\omega_b-\omega_o$ as shown in Figure 6, it is seen that when $\omega_b-\omega_o$ is equal to zero the maximum average anode current will be realized. When $\omega_b-\omega_o$ is equal to $\pi$ representing 180° out of phase difference between the burst and the oscillator signal, then $I_{dc}$, which is the average plate current, falls to zero. The condition when $\omega_b-\omega_o=\pi/2$ corresponds to the case where the burst and the oscillator frequencies are 90° out of phase. It is desired that this condition at this point be a null point in keeping with the type of frequency and phase discriminator characteristics normally taught by conventional phase and frequency discriminators. This is accomplished by an adjustment of the negative voltage on the terminal 39 to a condition at which the output of the frequency discriminator will be zero when the burst frequency and the oscillator frequency are 90° out of phase. As is seen from the curve 62 in Figure 6, maximum outputs of current from the phase discriminator can be realized when the oscillator and burst frequency are in phase or 180° out of phase.

Figures 7, 8:
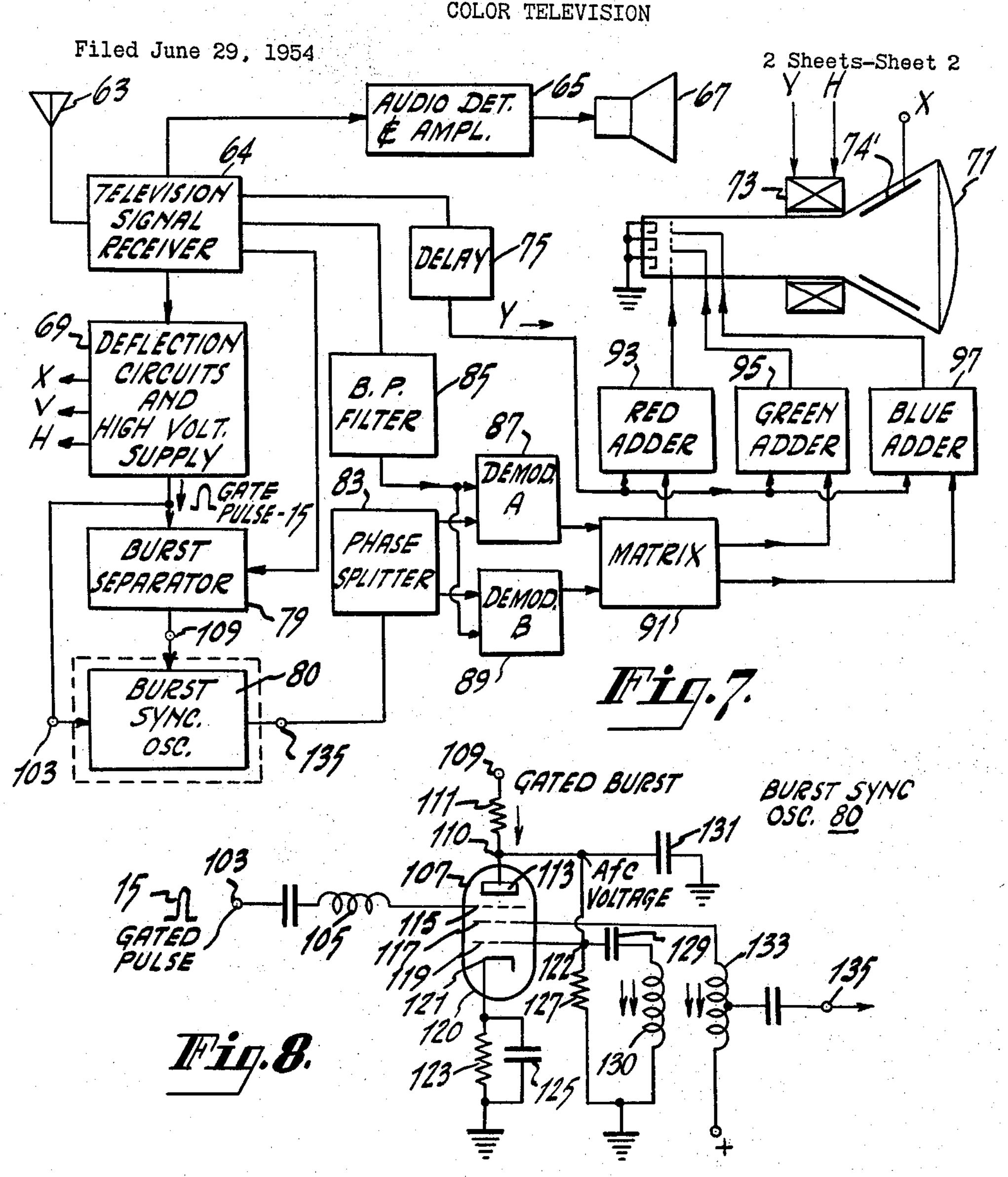
Figure 7 shows a block diagram of a color television receiver which employs a burst synchronized oscillator.
Figure 8 shows one version of the burst synchronized oscillator 80 illustrated in block form in Figure 7. This version follows from the teachings of the present invention.

Consider now the block diagram of the color television receiver shown in Figure 7. Here the incoming signal arrives at the antenna 63 and is applied to the television signal receiver 64. The television signal receiver 64 then delivers a recovered color television signal including the sound information, which is transmitted on a sound carrier 4½ mcs. removed from the picture carrier. The television signal receiver 64 includes the functions of first detection, intermediate frequency amplification, second detection and automatic gain control. Many of these functions are described in chapter 22 of the book "Harmonics, Sidebands and Transients in Communication Engineering," by C. Louis Cuccia, published by the McGraw-Hill Book Co. in 1952.

The sound information is then recovered by using, for example, the well known principles of intercarrier sound in the audio detector and amplifier 65. The recovered sound information is then applied to the loud speaker 67.

The color television signal information relating to the image is accommodated in at least four channels of the color television receiver, these channels being adapted to produce the recovered color signals which are applied to the color kinescope 71.

One branch emanating from the television signal receiver 64 is concerned with the picture synchronizing signals. This branch is applied to the deflection circuits and high voltage supply 69 which delivers deflection signals to the yokes 73, in addition to a high voltage signal to the ultor 74. Another function of the deflection circuits and high voltage supply 69 is to produce the gate pulse 15. The gate pulse generator is usually a kickback voltage winding which is included on the high voltage supply transformer; it has the function of providing the gate pulse 15 during the horizontal blanking period.

Another branch emanating from the television signal receiver 64 is impressed on the burst separator 79 upon which is also impressed the gate pulse 15. The gate pulse 15 is timed whereby it opens a burst gate during the duration interval of the color synchronizing burst thereby causing burst separation. The separated burst is then fed by the burst separator 79 to the burst synchronized oscillator 80 which, utilizing the separated burst and the gate pulse 15 in a manner to be described, produces a local oscillator signal which is accurately synchronized with the phase and frequency of the color synchronizing burst.

Another branch emanating from the television signal receiver 64 passes the color television signal through the bandpass filter 85, this filtered signal is then applied simultaneously to the demodulator A87 and the demodulator B89. At the same time, the burst synchronized oscillator 80 delivers a synchronized synchronous detection signal to the demodulator A87 and a phase shifted synchronous detection signal to the demodulator B89 by use of the phase shifter 83. In the demodulator A87 and the demodulator B89, synchronous detection of a predetermined group of color-difference signals is realized. These color-difference signals may be I and Q signals, or $R-Y$ and $B-Y$ signals, or any group of signals which may be suitable for eventual reconstruction of component color image information. The outputs of the demodulator A87 and the demodulator B89 are applied to the matrix circuit 91 at whose output $R-Y$, $G-Y$, and $B-Y$ signals are realized.

The fourth branch which emanates from the television signal receiver is the Y or luminance channel. The Y signal information is passed through the Y delay line 75 and applied simultaneously to the red adder 93, the green adder 95, and the blue adder 97 to which are also applied the corresponding color-difference signals thereby causing the recovery of component red, green, and blue signals which are applied to appropriate control grids of the color kinescope 71.

Figure 8 shows one version of the burst synchronized oscillator 80 which follows from the teachings of the present invention. In this version, combined oscillator phase discriminator and frequency and phase control action are incorporated into the circuit involving a single electron control tube or electron control device.

Consider the circuit involved in connection with the multigrid tube 120. The control grid 119 is associated with the grid terminal 122, the grid leak parameters including the condenser 129 and the resistor 127 which is coupled from the grid terminal 122 to ground and the tuned grid resonant circuit 130 which is also coupled to ground. The screen grid, which in this particular version forms the anode of the oscillator part of the circuit, is coupled through the tuned circuit 133 to the positive bias source. The output signal constituting the oscillator signal which is to be applied to the demodulator impressed on the output terminal 135.

The gated burst is applied to the anode terminal 109 which transfers this grid burst through the anode resistor 111 to the anode 113. The gate pulse 15 is applied to the terminal 103 which transfers this gate pulse to the suppressor grid 115. By proper application of potentials to the suppressor grid 115 in association with the gate pulse 15 the space charge distribution control characteristics of the suppressor grid 115 may be utilized. These space charge distribution control characteristics involve the fact that if the suppressor grid 115 is made sufficiently positive, a reduced amount of current flows to the screen grid 117 with the majority of the space charge current flowing to the anode 113. However, as the suppressor grid potential is reduced, a lesser and lesser amount of space charge current reaches the anode 113 with an increasingly larger amount reaching the screen grid 117. The anode is or may be, effectively speaking, isolated space charge currentwise, from the control grid 119 and the screen grid 117.

In a manner corresponding to the teachings described in connection with the phase discriminator circuits shown in Figures 2, 3 and 4, a signal is produced at the anode terminal 110 which is indicative of any phase difference which may be present between the gated burst and the signal produced by the oscillator, the oscillator in this case being one of the parameters associated with the multigrid tube 120. This phase difference indicative potential produced at the anode terminal 110 is then integrated by the capacitor 131 which produces the necessary filtering action; the integrated or filtered phase indicative voltage is then applied to the control grid electrode 122 in such a way that the bias as applied to the control grid 19 controls the frequency of the oscillator portion of the circuit in a manner that the output frequency of the oscillator as realized at the output terminal 135 follows closely the phase and frequency prescribed by the burst. Another action of the circuit which follows from the action of the suppressor grid 115 in response to the gate pulse 15 is that start-stop action may also be realized. By properly biasing the suppressor grid in association with the applied gate pulse 15, the application of the gate pulse 15 will cause the oscillator either to cease oscillating or to reduce its oscillation level for a portion following the end of the scanning line and prior to the introduction of the next burst which precedes the next scanning line. This start-stop action is highly desirable since the oscillator will then be caused to start oscillating at a frequency which is very closely synchronized with that of the burst. The pull-in time for a start-stop oscillator can be made to be much shorter than that for continuously operating oscillator. In the case of the present circuit shown in Figure 8 the gate pulse 15, when applied to the terminal 103 which is associated with the suppressor grid 115 should be such that start-stop action is instituted, with the timing such that the start-stop action does not interfere with the phase discriminator action produced in the tube which is so essential to the realization of the present invention. Note for example that the gate pulse too, may be differentiated to constitute both a leading positive pulse and a lagging negative pulse with the leading positive pulse being utilized to turn off the oscillator and the second negative pulse being utilized in a way whereby the starting of the oscillator is enhanced with possibly the second pulse being utilized to control the space charge distribution between the anode 7 and the screen grid 117 during the duration of the color synchronizing burst in a manner which optimizes and enhances the phase discriminator action of the device.

Having described the invention, what is claimed is:

1. In a color television receiver, said color television receiver adapted to receive a color television signal, said color television signal including a color synchronizing burst, said color synchronizing burst having a predetermined phase and frequency, a frequency and phase controlled oscillator circuit comprising in combination, an oscillator circuit, said oscillator circuit adapted to produce oscillations at substantially the frequency and phase of said color synchronizing burst, a gating circuit, said gating circuit including apparatus for gating said color synchronizing burst from said color television signal to yield a gated color synchronizing burst, said gating circuit also adapted to yield a gate pulse having a duration interval substantially that of said color synchronizing burst, a discriminator device, said discriminator device having at least an output electrode and a control electrode, means for coupling said oscillator to said control electrode, means for coupling said gated color synchronizing burst to said output electrode means for utilizing said discriminator device to yield a reference signal at said output electrode which is indicative of the phase and frequency difference between the output signal of said oscillator and said color synchronizing burst, a low pass filter circuit, said low pass filter circuit utilized to filter said reference signal, a frequency control device, said frequency control device coupled to said oscillator circuit and responsive to said reference signal as filtered by said low pass filter circuit for causing said oscillator to oscillate at a frequency and phase prescribed by said color synchronizing burst.

2. The invention as set forth in claim 1 and wherein is included a limiter circuit, said limiter circuit being coupled between said oscillator and said control electrode of said discriminator to cause an amplitude limiting action on the signals provided by said oscillator to said control electrode.

3. The invention as set forth in claim 1 and wherein a variable potential source is coupled to said output electrode to yield adjustment of the amplitude-versus-phase curve of the reference signal provided by said discriminator device.

4. In a color television receiver, said color television receiver adapted to receive a color television signal, said color television signal including a color synchronizing burst said color synchronizing burst having a predetermined frequency and phase and duration interval, a burst synchronized oscillator circuit comprising in combination, a multigrid electron control device, said multigrid electron control device having at least an output electrode and a plurality of control electrodes, an oscillator network, said oscillator network coupled to selected grids of said plurality of grids to provide oscillations in said oscillator network having substantially the frequency and phase of said color synchronizing burst, a gate circuit, means for utilizing said gate circuit to separate said color synchronizing burst from said color television signal to provide a gated burst, means for applying said gated color synchronizing burst to said output electrode, means for applying potentials to said multigrid electron control device for developing a reference signal at said output electrode which is indicative of the phase and frequency difference between said oscillations developed in said oscillator network and said color synchronizing burst, means for utilizing said reference signal to cause the phase and frequency of the oscillations produced in said oscillator network to conform to the phase and frequency prescribed by said color synchronizing burst.

5. The invention as set forth in claim 4 and wherein said gate circuit is also adapted to provide a gate pulse, said gate pulse having a duration interval bearing a predetermined relationship to said color synchronizing burst, means for applying said gate pulse to an appropriate control grid of said multigrid electron control device to cause said oscillations produced in said oscillator network to diminish in amplitude level below a predetermined amplitude level for a prescribed time interval prior to said color synchronizing burst.

6. In a color television receiver, said color television receiver adapted to receive a color television signal, said color television signal including a color synchronizing burst, said color synchronizing burst having a predetermined frequency and phase and duration interval, a burst synchronized oscillator circuit comprising in combination, a multigrid electron control device, said multigrid electron control device having at least an output electrode and a plurality of control electrodes, an oscillator network, said oscillator network coupled to at least one of said plurality of control electrodes and caused to develop oscillations having substantially the frequency and phase of said color synchronizing burst, a gate pulse generator and gate circuit, said gate pulse generator and gate circuit including means to yield both a gated color synchronizing burst which is separated from the color television signal and also a gate pulse which has a duration interval having a predetermined relationship to said color synchronizing burst, means for applying said gated synchronizing burst to said output electrode means for adjusting the electron flow in said multigrid electron control device during the duration interval of said gated color synchronizing burst to develop a reference signal at said output electrode which is indicative of the phase and frequency difference between the oscillations produced in said oscillator network and the frequency and phase of said color synchronizing burst, an integrating circuit, means for integrating said reference signal to provide an integrated reference signal, means for coupling said integrated reference signal to at least one of said plurality of control electrodes associated with said oscillating network to provide frequency and phase control of said oscillations produced in said oscillator network.

7. In a color television receiver, said color television receiver adapted to receive a color television signal, said color television signal including a color synchronizing burst, said color synchronizing burst having a predetermined frequency and phase and duration interval, a burst synchronized oscillator circuit comprising in combination, a multigrid electron control device, said multigrid electron control device having at least an output electrode and a plurality of control electrodes, an oscillator network, said oscillator network coupled to at least one of said plurality of control electrodes and cause to develop oscillations at said control electrode having substantially the frequency and phase of said color synchronizing burst, a gate pulse generator and gate circuit, said gate pulse generator and gate circuit operatively connected to develop both a gated color synchronizing burst from the color television signal and also a gate pulse which has a duration interval having a predetermined relationship to said color synchronizing burst, means for applying said gated color synchronizing burst to said output electrode, means for developing a reference signal at said output electrode which is indicative of the phase and frequency difference between the oscillations produced in said oscillator network and the frequency and phase of said color synchronizing burst, an integrating circuit, means for integrating said reference signal to provide an integrated reference signal, means for coupling said integrated reference signal to at least one of said plurality of control electrodes associated with said oscillating network to provide bias control and therefore frequency and phase control of said oscillations produced in said oscillator network, means for applying said gate pulse to at least a second of said plurality of control electrodes to cause the oscillations produced in said oscillator network to be reduced in level below a predetermined amplitude level for a prescribed interval preceding said color synchronizing burst.

8. The invention as set forth in claim 7 and wherein is provided a fixed reference potential and a capacitor, said capacitor coupled between said output electrode and said fixed reference potential to provide said integration of said reference signal.

9. The invention as set forth in claim 7 and wherein said gate pulse as applied to at least said second of said plurality of control electrodes to cause electron flow to flow to said output electrode only for a duration interval substantially that of said color synchronizing burst.

10. The invention as set forth in claim 7 and wherein said gated color synchronizing burst is also utilized to injection-lock the frequency and phase of said oscillations produced in said oscillator network.

11. In a color television receiver, said color television receiver adapted to receive a color television signal, said color television signal including a color synchronizing burst, said color synchronizing burst having a predetermined frequency and phase and duration interval, a burst synchronized oscillator circuit comprising in combination, a multigrid electron control device, said multigrid electron control device having at least an output electrode and a plurality of control electrodes, an oscillator network, said oscillator network coupled to at least one of said plurality of control electrodes and operatively connected to provide oscillations having substantially the frequency and phase of said color synchronizing burst, a gate pulse generator and gate circuit, said gate pulse generator and gate circuit including means to develop both a gated color synchronizing burst from the color television signal and also a gate pulse which has a duration interval having a predetermined relationship to said color synchronizing burst, means for applying said gated color synchronizing burst to said output electrode, means for developing a reference signal at said output electrode which is indicative of the phase and frequency difference between the oscillations produced in said oscillator network and the frequency and phase of said color synchronizing burst, an integrating circuit, means for integrating said reference signal to provide an integrated reference signal, means for coupling both said gated color synchronizing burst and said integrated reference signal to at least one of said plurality of control electrodes associated with said oscillating network to provide frequency and phase control of said oscillations produced in said oscillator network, means for applying said gate pulse to at least a second of said plurality of control electrodes for causing the oscillations produced in said oscillator network to reduce in level below a predetermined amplitude level for a prescribed interval preceding said color synchronizing burst.

12. In a color television receiver, said color television receiver adapted to receive a color television signal, said color television signal including a color synchronizing burst, said color synchronizing burst having a predetermined frequency and phase and duration interval, a burst synchronized oscillator circuit comprising in combination, a multigrid electron control device, said multigrid electron control device having at least an output electrode and a plurality of control electrodes, an oscillator network, said oscillator network coupled to at least one of said plurality of control electrodes and operatively connected to provide oscillations having substantially the frequency and phase of said color synchronizing burst, a gate pulse generator and gate circuit, said gate pulse generator and gate circuit including means to develop both a gated color synchronizing burst from the color television signal and also a gate pulse which has a duration interval having a predetermined relationship to said color synchronizing burst, means for applying said gated color synchronizing burst to said output electrode, means for developing a reference signal at said output electrode which is indicative of the phase and frequency difference between the oscillations produced in said oscillator network and the frequency and phase of said color synchronizing burst, a low pass filter circuit, means for passing said reference signal through said low pass filter circuit to provide a filtered reference signal, means for coupling said filtered reference signal and said gated color synchronizing burst to at least one of said plurality of control electrodes associated with said oscillating network to provide frequency and phase control of said oscillations produced in said oscillator network, means for applying said gate pulse to at least a second of said plurality of control electrodes for causing the oscillations produced in said oscillator network to be reduced in level below a predetermined amplitude level for a prescribed interval preceding said color synchronizing burst.

13. In a color television receiver, the combination of, a source of color television signals including color synchronizing bursts, an electron flow device having at least an anode, a cathode and a control electrode, means to apply said bursts to said anode, network means coupled to said control electrode for developing oscillations at said control electrode, means operatively connected to said anode for developing a reference signal at said anode which is indicative of the frequency and phase relationship between said color synchronizing bursts and said oscillations developed at said control electrode and means coupled between said anode and said network means for utilizing said reference signal for controlling the frequency and phase of said oscillations developed at said control electrode.

14. In a color television receiver, the combination of, a source of chrominance signals including color synchronizing bursts having prescribed frequency and phase, an electron control device having at least a control electrode and an anode, oscillator circuit means coupled to said control electrode for developing oscillations at said control electrode having substantially the frequency and phase of said color synchronizing bursts, means for coupling said source to said anode, pulser means for providing pulses having the duration interval substantially of said color synchronizing bursts, means for applying said pulses to said anode to cause said electron control device to be operative only during said bursts and to develop a reference signal at said anode which is indicative of the frequency and phase relationship between said color synchronizing bursts and the oscillations developed at said control electrode, filter means coupled between said anode and said oscillatory circuit means to integrate said reference signal and including frequency and phase controlling means responsive to said integrated reference signal for controlling the frequency and phase of the oscillations developed at said control electrode.

15. In a color television receiver adapted to receive a color synchronizing burst which occurs during each scanning retrace interval and which has a burst frequency and phase, a phase discriminator circuit comprising in combination: a first circuit to provide said bursts, an oscillator means to produce an output signal having substantially said burst frequency and having a phase to be determined, third means coupled to said first and second circuits to derive first and second signals respectively each having substantially burst frequency and capable of producing a signal indicative of the phase relationship between said burst phase and the phase of the output of said oscillator when applied to a phase discriminator means; a phase discriminator means comprising an electron tube means having at least an electron flow source, an output electrode and a control electrode and operable to produce a signal representative of the phase relationship between two waves of related phase applied respectively to said control electrode and to said output electrode responsive to said signals applied thereto; and means coupled between said third means and said output electrode and said control electrode to apply said first signal to said output electrode and said second signal to said control electrode thereby developing at said output electrode a signal indicating the first relationship between said burst and the output signal of said oscillator.

16. In a color television receiver adapted to receive a color synchronizing burst which occurs during each scanning retrace interval and which has a burst frequency and phase; a phase discriminator circuit comprising in combination: a first circuit to provide said bursts; an oscillator means to develop an output signal having substantially the frequency of said bursts and having a phase whose relationship relative to said burst phase is to be determined; an electron tube having at least a cathode, a control electrode and an anode, and operable to produce a signal indicative of phase relationship as a result of signals of substantially the same frequency and having prescribed phase relationship applied between said anode and said control electrode; means coupled between said first circuit and said anode to apply said bursts to said anode; and means coupled between said second circuit and said control electrode to apply said oscillator output to said control electrode thereby developing at said anode a signal representative of the phase relationship between said bursts and the output signal of said oscillator.

17. In a color television receiver adapted to receive a color synchronizing burst which occurs during each scanning retrace interval and which has a burst frequency and phase, a phase discriminator circuit comprising in combination: a first circuit to provide said bursts, an oscillator means to develop an output signal having substantially the frequency of said bursts and having a phase whose relationship relative to said burst phase is to be determined, an electron tube having at least a cathode, a control electrode, and an output electrode, and operable to produce a signal indicating phase relationship as a result of signals of substantially the same frequency and having prescribed phase relationship applied between said output electrode and said control electrode; means coupling said first circuit to said control electrode to apply said bursts to said control electrode, means coupling said second circuit to said output electrode to apply the output signal of said oscillator means to said output electrode whereby a signal is developed at said output electrode which is indicative of the phase relationship between said bursts and the output signal of said oscillator.

18. In a color television receiver adapted to receive a color synchronizing burst which occurs during each scanning retrace interval and which has a burst frequency and phase, a phase discriminator circuit comprising in combination: a first circuit to provide said bursts, an oscillator means to develop an output signal having substantially the frequency of said bursts and having a phase whose relationship relative to said burst phase is to be determined, an electron tube having at least a cathode, a control electrode, and an anode, and operable to produce a phase relationship indicating signal as a result of signals of substantially the same frequency and having prescribed phase relationship applied between said anode and said control electrode; a limiter circuit means; means coupling said limiter circuit between said second circuit and said control electrode to limit the output amplitude of the output signal of said oscillator and to apply the amplitude limited output signal to said control electrode; and means coupling said first circuit to said output electrode to apply said bursts to said output electrode whereby a signal is produced in the electron flow of said electron tube which is proportional to the phase relationships between said bursts and said output signal of said oscillator means.

19. In a color television receiver adapted to receive a color synchronizing burst which occurs during each scanning retrace interval and which has a burst frequency and phase, a phase discriminator circuit comprising in combination: a first circuit to provide said bursts, an oscillator means to produce an output signal having substantially said burst frequency and having a phase to be determined, third means coupled to said first and second circuits to derive first and second signals respectively, each having substantially the burst frequency and capable of producing a signal indicative of the phase relationship between said burst phase and the phase of the output of said oscillator when applied to a phase discriminator means; a phase discriminator means comprising an electron tube means having at least an electron flow source, an output electrode and a control electrode and operable to produce a signal representative of the phase difference between two waves of different phase applied respectively to said control electrode and to said output electrode responsive to said signals applied thereto; means coupled between said third means and said output electrode and said control electrode to apply said first signal to said output electrode and to couple said second signal to said control electrode; pulser means to develop pulses which occur substantially in coincidence with and during said bursts during said scanning retrace interval; means to apply said pulses to said output electrode of said electron tube means to render said electron tube means operable only for the duration of said bursts; and means to derive from the electron flow of said electron tube means during said bursts a reference signal which is proportional to the phase relationship between said bursts and the output signal of said oscillator.

20. In a color television receiver adapted to receive a color synchronizing burst having a prescribed frequency and phase, the combination of: a local oscillator to produce an output signal having a frequency related to said burst frequency, a frequency and phase control means coupled to said oscillator and operative to control the frequency and phase of said oscillator output signal responsive to a control signal applied thereto; a phase discriminator including an electron tube having at least a cathode, control electrode and an output electrode and capable of developing a signal in its electron stream which is proportional to the phase relationship between signals having related frequency and applied between said output electrode and said control electrode, means to apply said bursts to said output electrode, means coupling said oscillator to said control electrode; means rendering said electron tube operative at least during said bursts to develop in the electron flow of said electron tube a signal which is proportional to the phase relationship between the output signal and said oscillator and said bursts; an integrating circuit coupled to said electron tube and responsive to said phase-relationship indicating signal developed in said electron flow to produce an integrated reference signal which is also proportional to the phase relationship between the output signal of said oscillator and said bursts; and means to apply said integrating reference signal as a control signal to said frequency and phase controlled device to control the frequency and phase of said oscillator in accordance with the frequency and phase of said bursts.

21. The invention as set forth in claim 20 and wherein said bursts are applied to said output electrode and the output signal of said oscillator is applied to said control electrode.

References Cited in the file of this patent

UNITED STATES PATENTS 2,594,380 Barton ---------------- Apr. 29, 1952

(Other references on following page)

UNITED STATES PATENTS

| | | |
|---|---|---|
| 2,653,187 | Luck | Sept. 22, 1953 |
| 2,713,608 | Sonnenfeldt | July 19, 1955 |
| 2,726,282 | Bigelow | Dec. 6, 1955 |
| 2,740,046 | Tellier | Mar. 27, 1956 |
| 2,743,369 | Sands | Apr. 24, 1956 |

OTHER REFERENCES

Color TV, Rider Publication, March 1954, pages 141 and 142.

Design Techniques for Color Television Receivers, Electronics, February 1954, page 143.